United States Patent
Brence

[11] Patent Number: 5,946,891
[45] Date of Patent: *Sep. 7, 1999

[54] CONTROLLABLE STOP VIBRATORY FEEDER

[75] Inventor: David A. Brence, Empire, Colo.

[73] Assignee: FMC Corporation, Chicago, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/681,238

[22] Filed: Jul. 22, 1996

[51] Int. Cl.[6] .............................. B65B 1/08; B65B 37/04; F16F 9/04
[52] U.S. Cl. ...................... 53/493; 53/502; 267/140.14
[58] Field of Search ............................ 53/502, 251, 250, 53/437, 501, 493, 495, 52, 525; 267/140.14, 140.15, 140.11; 188/267

[56] References Cited

U.S. PATENT DOCUMENTS

| | | | |
|---|---|---|---|
| 4,350,243 | 9/1982 | Weyandt | 198/769 |
| 4,354,618 | 10/1982 | Weyandt | 221/186 |
| 4,382,527 | 5/1983 | Lerner | 53/502 X |
| 4,418,816 | 12/1983 | Kropp | 198/773 |
| 4,607,478 | 8/1986 | Maglecic | 53/502 |
| 4,967,540 | 11/1990 | Coppolani | 53/502 |
| 5,054,606 | 10/1991 | Musschoot | 198/751 |
| 5,277,281 | 1/1994 | Carlson et al. | 188/267 |
| 5,284,330 | 2/1994 | Carlson et al. | 267/140.14 |
| 5,351,807 | 10/1994 | Svejkovsky | 198/750 |
| 5,382,373 | 1/1995 | Carlson et al. | 252/62.55 |
| 5,398,917 | 3/1995 | Carlson et al. | 267/140.14 |
| 5,462,155 | 10/1995 | Demar et al. | 198/760 |
| 5,492,312 | 2/1996 | Carlson | 267/140.14 |
| 5,699,897 | 12/1997 | Svejkovsky | 198/750.8 |

FOREIGN PATENT DOCUMENTS

| | | |
|---|---|---|
| 0 548 812 A2 | 12/1992 | European Pat. Off. |
| 354571 | 8/1931 | United Kingdom |
| 0824999 | 5/1957 | United Kingdom |
| 926120 | 5/1963 | United Kingdom |
| 933748 | 8/1963 | United Kingdom |
| 1069686 | 5/1967 | United Kingdom |
| 1381717 | 1/1975 | United Kingdom |
| 2005380 | 4/1979 | United Kingdom |

OTHER PUBLICATIONS

J.D. Carlson and K.D. Weiss, *A Growing Attraction to Magnetic Fluids*. Machine Design, Aug. 8, 1994.
CCW–Z–214W, Ishida Scales Mfg. Co., Ltd. brochure, Kyoto, Japan. (No Date).
CCW–Z–214W–WP, Ishida Scales Mfg. Co., Ltd. brochure, Kyoto, Japan. (No Date).
*HS–3 Hi–Speed Feeder Electromagnetic Vibratory Feeder*, Eriez Magnetic brochure, 1993.
*Dataweigh Sigma Series*, Yamato Scale Co., Ltd. brochure, Akashi, Japan.
*Dream Machine*, The Woodman Company publication, No date.
*Worldstar Datatouch*, Paxall Parsons Machinery publication, No date.

*Primary Examiner*—James F. Coan
*Attorney, Agent, or Firm*—Rockey, Milnamow & Katz, Ltd.

[57] ABSTRACT

There is provided a vibratory feeder comprising an exciter for exciting the vibratory feeder and a damper assembly which is selectively activated. There is also provided a vibratory feeder comprising an exciter and a controllable viscosity fluid damper which is activated at a first level to reduce the stroke of the feeder. There is further provided a vibratory feeder for feeding product, the feeder including a spring for supporting a first mass from a second mass wherein a damper assembly is disposed between the first mass and the second mass, the damper assembly being selectively activated. There is also provided a packaging system comprising a vibratory feeder having a damper assembly which is selectively activated.

20 Claims, 3 Drawing Sheets

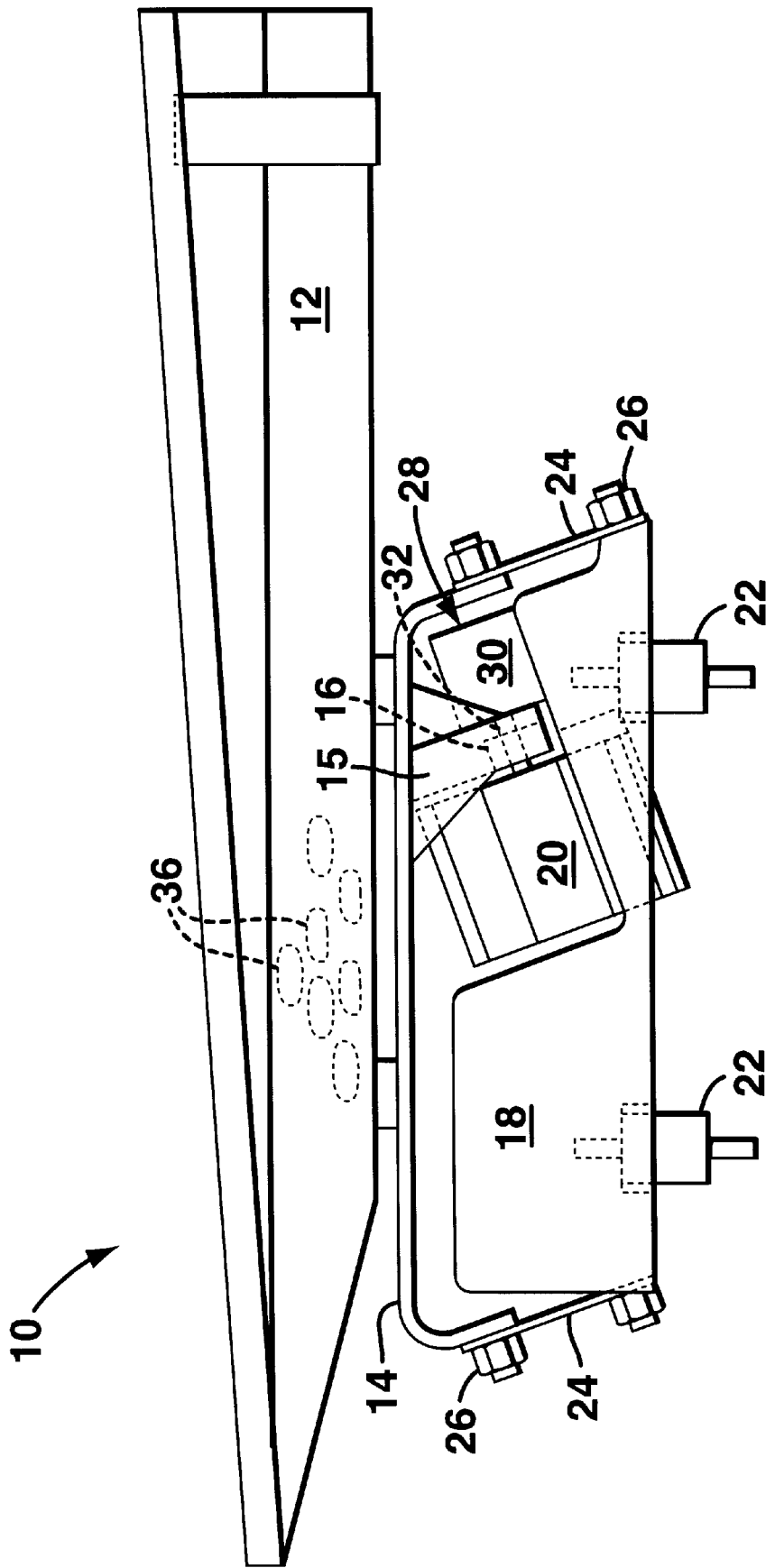
FIG_1

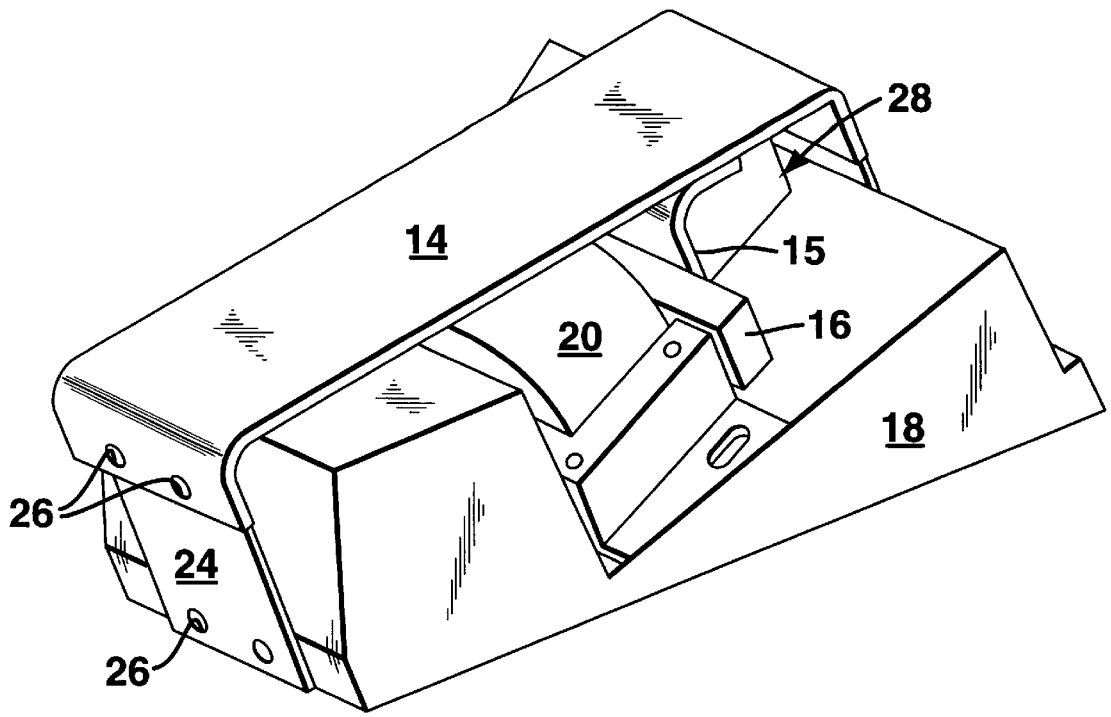
FIG_2
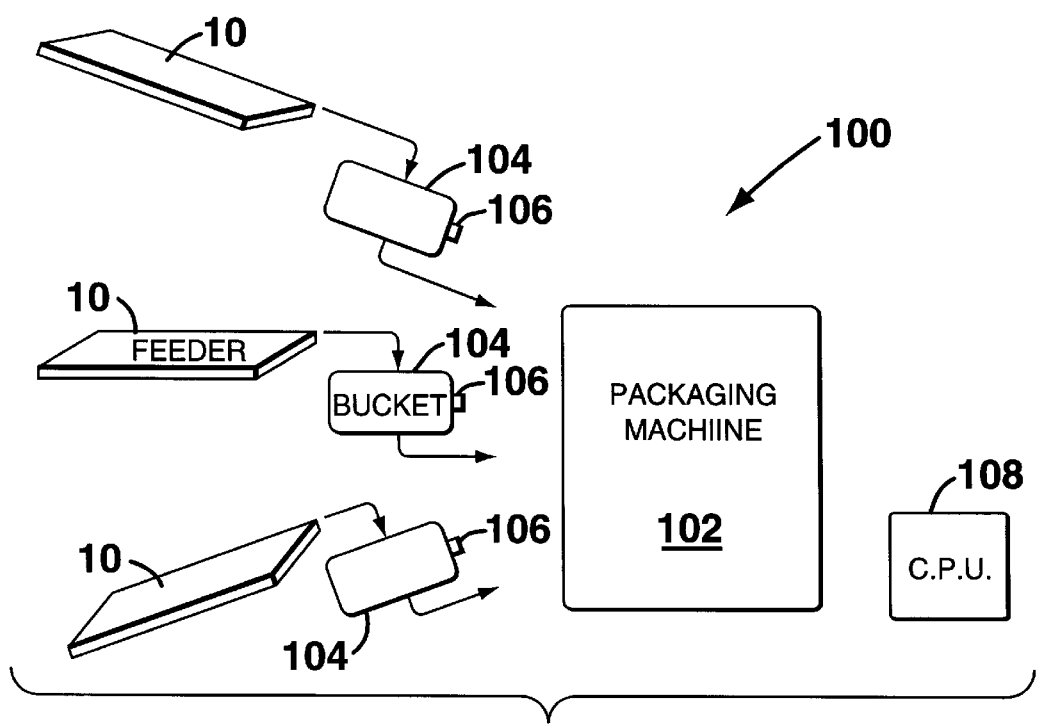
FIG_4

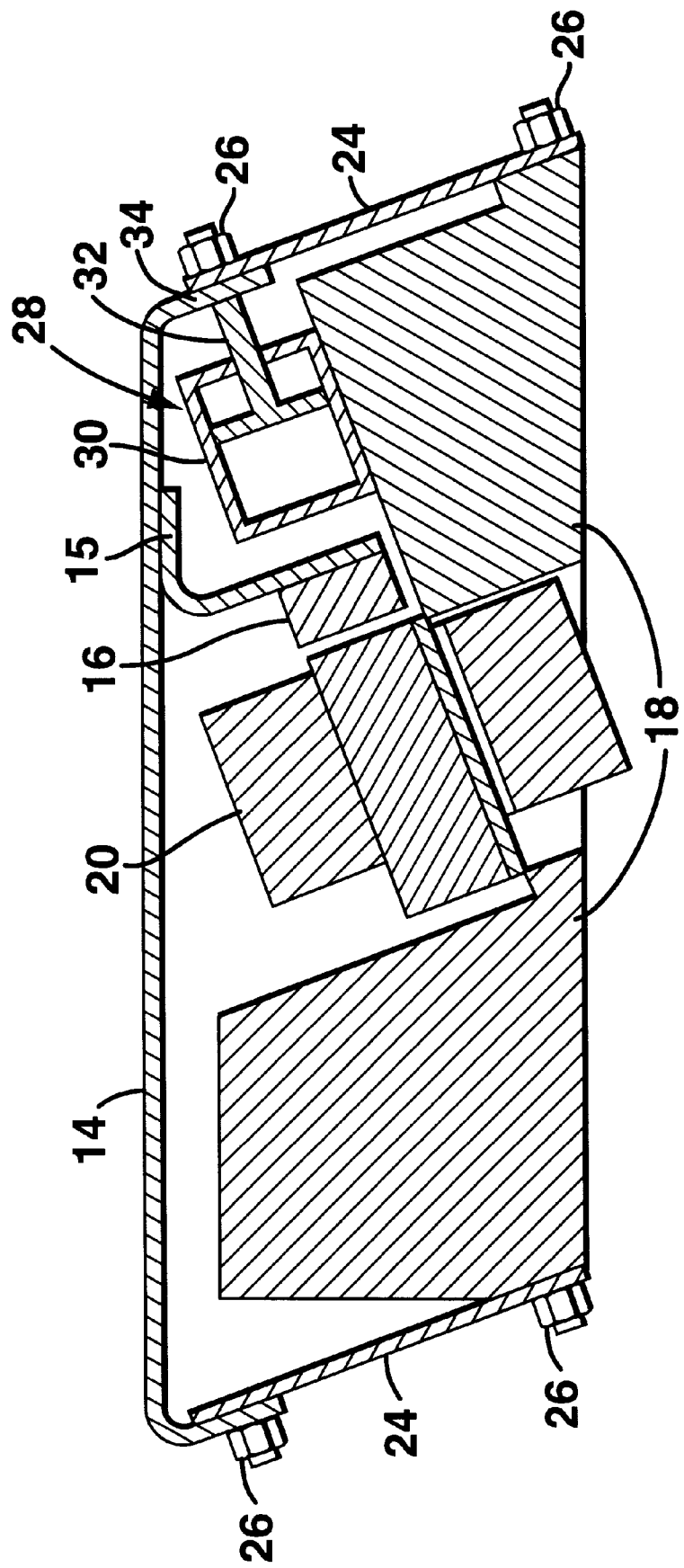
FIG_3

CONTROLLABLE STOP VIBRATORY FEEDER

BACKGROUND OF THE INVENTION

1. Field of the Invention

This invention relates to feeders and more particularly to dampers for use on vibratory feeders.

2. Description of Related Art

Electromagnetic vibratory feeders are commonly used to provide product to a packaging machine. Multiple units of vibratory feeders may be aligned either linearly or peripherally about the packaging machine head and product may be fed into individual weighing buckets or hoppers. The buckets may be part of the packing machine itself or may be external to a packaging machine. In either case, product is fed into the packaging machine so that the product may be packaged. There may be, for example, twelve vibratory machines and a corresponding twelve buckets which feed product into the packaging machine.

The weights of the individual buckets are scanned by a central processing unit to provide a total weight within the preset tolerances for packaging. That is, the weight of the individual buckets are scanned to provide a combination such that the total weight of a given number of buckets falls within the predetermined tolerance for the packaging. Due to the fact that the vibratory feeders dribble (i.e., product may continue to flow slightly after the vibratory feeder is turning off because of a residual vibration action of the feeder), the contents in an individual bucket may be slightly off of the targeted amount. Because of the statistical variance of the weights provided by the vibratory equipment to the individual buckets, typically the combination of three to four buckets may be needed to provide the total weight desired.

Conventional means of damping vibratory mechanical momentum to reduce the effects of feeder dribble include the use of rubber composite type dampers or magnetic dampers. These dampers may be on at all times which increases the required input energy to operate the vibratory equipment. Therefore, it is desirable to have a damper assembly for use with vibratory equipment which is only activated selectively in order to reduce power consumption.

It is also desirable to have a damper assembly which may be used in conjunction with vibratory equipment such that the weight provided from the vibratory equipment may be better controlled. This may statistically allow the use of less buckets to achieve a total weight within the specified tolerances of the product being packaged and may allow the packaging machine to process faster and achieve more output in a given period of time.

SUMMARY OF THE INVENTION

There is provided a vibratory feeder comprising an exciter for exciting the vibratory feeder and a damper assembly which is selectively activated. There is also provided a vibratory feeder comprising an exciter for exciting the vibratory feeder and a controllable viscosity fluid damper which is activated at a first level to reduce the stroke of the feeder. There is further provided a vibratory feeder for feeding product, the feeder including a spring for supporting a first mass from a second mass wherein a damper assembly is disposed between the first mass and the second mass, the damper assembly being selectively activated. There is also provided a packaging system comprising at least one vibratory feeder comprising a damper assembly which is selectively activated, a control for activating the damper assembly, and a packaging machine, the vibratory feeder providing product to the packaging machine.

BRIEF DESCRIPTION OF THE DRAWINGS

FIG. 1 is an end view of a vibratory feeder in accordance with the principles of the present invention.

FIG. 2 is a perspective view of a portion of the vibratory feeder with the trough and isolators removed for illustration purposes.

FIG. 3 is an end view of the portion of the vibratory feeder showing an alternate embodiment for securing the damper assembly.

FIG. 4 is a schematic view of a packaging system utilizing the vibratory feeders of the present invention.

DESCRIPTION OF THE PREFERRED EMBODIMENTS

Referring to FIGS. 1 through 3, there is shown a vibratory feeder system 10 in accordance with the principles of the present invention. The vibratory feeder 10 comprises a trough 12, a trough mounting bracket 14, and an armature 16. The trough mounting bracket 14 comprises an armature bracket 15 for securing the armature 16 to the mounting bracket 14. The vibratory feeder 10 further comprises a base mass 18, a magnet or exciter 20, and isolators 22. As is standard in the industry, isolators 22 may be employed in order to help prevent vibratory forces from extending to the surface upon which the feeder 10 sits. Moreover, leaf springs 24 are secured to the mounting bracket 14 and base mass 18 via bolts 26.

As is known in the industry, the trough 12, trough mounting bracket 14, armature 16, and half of the leaf spring 24 mass may collectively be referred to as a first mass in a two-mass vibratory feeder system 10. The base mass 18, exciter 20, isolators 22, and half of the leaf spring 24 mass may collectively be referred to as a second mass in a two-mass vibratory feeder system 10. The leaf spring 24 mass may be evenly distributed between the first and second masses of the two-mass vibratory feeder system.

A damper assembly 28 is preferably secured between the first mass and second mass of the two-mass vibratory feeder system 10. Preferably, the damper housing 30 is secured to the first mass and the damper piston 32 is secured to the second mass. In the embodiment shown in FIG. 1, the damper piston 30 is secured to the armature 16. However, the damper piston 32 may also be secured to the armature bracket 15 instead of the armature 16. Further, in the embodiment shown in FIG. 3, the damper piston 32 is secured to the portion 34 of the trough mounting bracket 14 in the vacinity where the leaf spring 24 is secured. In both of the embodiments illustrated in FIGS. 1 and 3, the damper housing 30 is secured to the base mass 18. The damper housing 30 may be secured to the base mass 18 via bolts not shown. Preferably, the damper housing is disposed in between the leaf springs 24 on the base casting 18 as shown in FIGS. 1 and 3. Further, the damper piston 28 may be secured to the second mass via bolts not shown.

The damper assembly 28 may comprise a controllable viscosity fluid damper which is preferably a magnetorheological damper. As will be described, the damper assembly may be activated by a control 108 shown in FIG. 4. The magnetorheological damper 28 may be an MRD-1004 controllable damper manufactured by Lord Corporation of Erie, Pa. Alternatively, the magnetorheological damper 28 may, for example, be made in accordance with U.S. Pat. No.

5,492,312 assigned to Lord Corporation and which is incorporated herein by reference. For example, such a damper may have a maximum stroke of plus or minus 0.1 inches, a damping force of zero to fifty pounds which is continuously controllable, a response time of less than ten milliseconds, an axial spring rate of sixteen to three hundred eighty four pounds per inch, and an input power of twelve watts (one amp at twelve volts dc).

Referring now to FIG. 4, there is shown a schematic view of a packaging system 100 utilizing vibratory feeders 10 of the present invention. The packaging system 100 comprises a packaging machine 102, at least one vibratory feeder 10, and at least one corresponding bucket or scale machine 104. Depending upon the commercial packaging machine 102 utilized, the bucket 104 may be either external or internal to the packaging machine 102.

Typically, there may be ten to twelve vibratory feeders 10 and a corresponding number of buckets 104 for a given packaging machine, although only three of which are illustrated in FIG. 4. The packaging machine 102 may, for example, be a Selectacom 360-14 Model A14C6 packaging machine manufactured by Triangle Package Machine Co. of Chicago, Ill. having a sensor or transducer 106 on a respective bucket 104. The packaging machine 102 may be a two bucket system. That is, there are two buckets associated with a given vibratory feeder 10. One of the buckets may be a weighing bucket and the second bucket may be an accumulation bucket. For purposes of clarity, only one of the buckets is shown in FIG. 4. The sensor 106 provided with the packaging machine may be disposed on the weighing bucket 104.

The sensor 106 provides a signal to the control 108 for activating the damper assembly 28. The damper assembly 28 located on a given vibratory feeder 10 is activated by control 108 once the sensor 106 provides the signal to the control 108 indicating that the bucket is at the desired level. The control 108 may be the control of the Selectacom 360-14 Model A14C6 packaging machine. Further, the outputs of sensors 106 may be provided to the control 108, although the outputs are not shown for purposes of clarity.

The vibratory feeder 10 is driven by the exciter 20 and armature 16 allowing product 36 to be transferred via the trough 12. Further, the control 108 may control the energizing and de-energizing of the exciter 20 and the damper assembly 28. The control 108 may selectively excite or activate the damper assembly 28 when it is desired to stop the vibratory feeder 10. Selectively activating the damper assembly 28 helps reduce the power consumption of the vibratory feeder system 10.

At approximately the time when the exciter 20 is de-energized, the damper assembly 28 may be activated. By activating the damper assembly 28 when it is desired to stop the vibratory feeder 10, the damper assembly 28 may help to reduce the mechanical momentum of the vibratory feeder 10 including the residual force in the springs 24. That is, upon activating the damper assembly 28, the damper piston 32 becomes highly resistant to motion and thus helps to stop any mechanical displacement of the trough 12 which may occur after the exciter 20 is deactivated. Thus, the damper assembly 28 helps to provide a quick damping of the vibratory mechanical momentum which otherwise results due to the de-energizing the exciter 20. As a result, the vibratory feeder 10 may stop quicker, thus lessening the effects of dribble of product into a given bucket 104.

Preferably, the damper assembly 28 is activated just prior to deactivating or de-energizing the exciter 20. For example, the damper assembly 28 may be activated approximately one-fifth of a second prior to de-energizing the exciter 20. Alternately, the damper assembly 28 may be gradually excited at a given point in time prior to de-energizing the exciter 20 and ramping up the input to the damper assembly 28 to the maximum exciting level of the damper assembly. For example, the damper assembly 28 may be activated half a second before the exciter 20 is de-energized and may be ramped up linearly up to the point in time when the exciter 20 is de-energized.

As another alternative, the damper assembly 28 may be gradually activated or excited at a given point in time prior to de-energizing the exciter 20, ramping up the input to the damper assembly 28 to a higher exciting level, and then at a second point in time prior to de-energizing the exciter 20, providing a maximum exciting level of the damper assembly. That is, the damper assembly 28 may be activated at a first lower level at a first time and at a second higher level at a second time, the second time being approximate to when the exciter 20 is deactivated. For example, the damper assembly 28 may be ramped up to a first level between a half a second to one tenth of a second prior to the de-energizing of the exciter 20. At one-tenth of a second prior to the de-energizing of the exciter 20, the damper assembly 28 may be excited at the maximum level. As a result, the vibratory feeder 10 may be slightly damped before providing the full damping when the damping assembly 28 is fully powered. Where maximum throughput is desired, the damper assembly 28 may be activated just prior to the de-energizing of the exciter 20, such as one millisecond prior to the de-energizing of the exciter 20.

The application of power to the damper assembly 28 depends upon the speed of the product 36 being conveyed on the trough 12, the weight of the product 36, the inertia of the product 36, and the inertia of the trough 12. More damping may be desired for systems having higher inertia.

In addition to ramping up the exciting level of the damper assembly 28, the exciter 20 may be simultaneously ramped down for de-energizing the exciter 20. As a result, the control 108, for example, when providing a linear ramping to the damper assembly may provide an inverse linear de-ramping of the exciter 20. This may provide a more accurate distribution of the product 36 at the shutdown period of the vibratory feeder 10.

In some circumstances, it may be desirable to keep the damper assembly 28 on at a lower level when the exciter 20 is on. For example, where it is desired to lower the amplitude (i.e., reduce the stroke) of the vibratory feeder 10, instead of lowering the excitation of the exciter 20, the power to the damper assembly 28 may be increased. That is, the control 108 may control the amount of damping provided by the damper assembly 28 and thus may affect the amplitude of the exciter 20.

Further, when it is desired to stop the vibratory feeder 10, the power to the damper assembly 28 may be increased as discussed above. That is, the damper 28 may be activated at a second higher level at approximately when the exciter 20 is deactivated. As a result, when power is applied to the exciter 20, the power is lessened for the damper assembly 28 and when it is desired to stop the vibratory feeder, more power is applied to the damper assembly 28 and no power is provided to the exciter 20. Because the vibratory feeder 10 already has some level of damping, the vibratory feeder may be able to stop faster.

The damper assembly 28 may be turned off after any mechanical momentum of the vibratory feeder 10 has ceased. The damper assembly may, for example, be turned off one to two seconds after the exciter 20 has been deactivated. Alternatively, the damper assembly 28 may be turned off just before it is desired to turn on the exciter 20.

As disclosed, the damper assembly 28 is preferably secured between the first mass and the second mass of the two-mass vibratory feeder system 10. Although the damper housing 30 has been shown to be secured to the first mass and the damper piston 28 has been shown to be secured to the second mass, the damper housing 30 may be secured to the second mass and the damper piston 28 may be secured to the first mass. For example, the damper housing 30 may contact the trough 12 and the damper piston 28 may contact the base casting 18. Further, the damper housing 30 and the damper piston 28 may be secured to other respective portions of the two-mass vibratory feeder system 10. For example, the damper piston 28 may be secured to the trough 12 and the damper housing may be secured to the base casting 18.

Stop times for the vibratory feeder 10 may be quicker than conventional rubber dampers to stop the vibratory mechanical momentum. Typically, stop times of ten milliseconds may be achieved by using a damper assembly 28 on the vibratory feeder 28 as opposed to a nominal stop time of twenty five milliseconds by using conventional rubber dampers.

In addition to help providing a faster stop, the damper assembly 28 helps to provide a narrow, repeatable control of the weights to be packaged. That is, the product 36 output weight from the vibratory feeder 10 may be more strictly controlled because the vibratory feeder 10 may be capable of achieving tighter weight control due to the quicker stop time of the feeder. This further allows the packaging system 100 to operate more rapidly due to the fact that the packaging machine may need to use less buckets 104 for statistically providing the required weight of the product 36 to the packaging machine.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A vibratory feeder comprising:

an exciter for exciting said vibratory feeder; and a fluid damper assembly, said damper assembly being selectively activated.

2. The invention of claim 1 wherein said damper assembly is activated approximately when said exciter is deactivated.

3. The invention of claim 1 wherein said damper assembly comprises a controllable viscosity fluid damper.

4. The invention of claim 3 wherein said damper assembly comprises a magnetorheological damper.

5. A vibratory feeder comprising:

an exciter for exciting said vibratory feeder; and a damper assembly, said damper assembly being selectively activated, wherein said damper assembly is activated at a first lower level at a first time and at a second higher level at a second time, said second time being approximate to when said exciter is deactivated.

6. The invention of claim 5 wherein said damper assembly comprises a controllable viscosity fluid damper.

7. The invention of claim 6 wherein said damper assembly comprises a magnetorheological damper.

8. A vibratory feeder comprising:

an exciter for exciting said vibratory feeder; and a controllable viscosity fluid damper, said damper being activated at a first level to reduce the stroke of said feeder.

9. The invention of claim 8 wherein said damper is activated at a second higher level at approximately when said exciter is deactivated.

10. The invention of claim 8 wherein said damper is a magnetorheological damper.

11. In a vibratory feeder for feeding product, said feeder including a spring for supporting a first mass from a second mass, the improvement comprising:

a fluid damper assembly disposed between said first mass and said second mass, said damper assembly being selectively activated.

12. The invention of claim 11 wherein said damper assembly is activated approximately when an exciter in said vibratory feeder for exciting said feeder is deactivated.

13. The invention of claim 11 wherein said damper assembly comprises a controllable viscosity fluid damper.

14. The invention of claim 13 wherein said damper assembly comprises a magnetorheological damper.

15. In a vibratory feeder for feeding product, said feeder including a spring for supporting a first mass from a second mass, the improvement a damper assembly disposed between said first mass and said second mass, said damper assembly being selectively activated;

wherein said damper assembly is activated at a first lower level at a first time and at a second higher level at a second time, said second time being approximate to when an exciter in said vibratory feeder is deactivated.

16. The invention of claim 15 wherein said damper assembly comprises a controllable viscosity fluid damper.

17. The invention of claim 16 wherein said damper assembly comprises a magnetorheological damper.

18. A packaging system comprising:

at least one vibratory feeder comprising a fluid damper assembly which is selectively activated;

a control for activating said damper assembly; and a packaging machine, said vibratory feeder providing product to said packaging machine.

19. The invention of claim 18 further comprising a bucket, said bucket receiving said product from said vibratory feeder, said bucket comprising a sensor for providing a signal to said control for activating said damper assembly.

20. A packaging system comprising:

at least one vibratory feeder comprising a damper assembly which is selectively activated;

a control for activating said damper assembly;

a packaging machine, said vibratory feeder providing product to said packaging machine; and a bucket, said bucket receiving said product from said vibratory feeder, said bucket comprising a sensor for providing a signal to said control for activating said damper assembly;

wherein said damper assembly comprises a controllable viscosity fluid damper.

* * * * *